United States Patent
Szuba

(10) Patent No.: US 8,701,853 B2
(45) Date of Patent: Apr. 22, 2014

(54) LANCE-AND-FORM SPLINES WITH FORMED HOUSING LIP SNAP RING RETENTION

(75) Inventor: Joseph Szuba, Dearborn, MI (US)

(73) Assignees: Szuba Consulting, Inc., Dearborn, MI (US); Value Extraction LLC, Dearborn, MI (US)

( * ) Notice: Subject to any disclaimer, the term of this patent is extended or adjusted under 35 U.S.C. 154(b) by 0 days.

(21) Appl. No.: 13/572,003

(22) Filed: Aug. 10, 2012

(65) Prior Publication Data

US 2013/0037374 A1 Feb. 14, 2013

Related U.S. Application Data

(60) Provisional application No. 61/522,797, filed on Aug. 12, 2011.

(51) Int. Cl.
   *F16D 13/52* (2006.01)
   *F16D 13/58* (2006.01)
   *F16D 13/68* (2006.01)

(52) U.S. Cl.
   USPC ........................................................ 192/70.2

(58) Field of Classification Search
   USPC ............................................. 192/70.19, 70.2
   See application file for complete search history.

(56) References Cited

U.S. PATENT DOCUMENTS

| | | | | |
|---|---|---|---|---|
| 3,191,735 A | * | 6/1965 | Wavak | 192/70.2 |
| 3,915,272 A | * | 10/1975 | Maurice | 192/70.2 |
| 4,225,026 A | * | 9/1980 | Yamamori et al. | 192/70.2 |
| 4,566,571 A | * | 1/1986 | Fujioka | 192/70.2 |
| 6,272,725 B1 | * | 8/2001 | Stout, Jr. | 192/70.2 |
| 7,540,212 B2 | * | 6/2009 | Oki et al. | 192/70.2 |
| 2007/0193845 A1 | * | 8/2007 | Uhler | 192/70.27 |
| 2008/0067023 A1 | * | 3/2008 | Sahyoun et al. | 192/70.2 |
| 2011/0278131 A1 | * | 11/2011 | Keating et al. | 192/112 |

OTHER PUBLICATIONS

PCT/SE 2005/000841 International Search Report dated Aug. 19, 2005.

* cited by examiner

*Primary Examiner* — David D Le
*Assistant Examiner* — Jacob S Scott
(74) *Attorney, Agent, or Firm* — Warner Norcross & Judd LLP

(57) ABSTRACT

A housing for use with a clutch assembly includes an annular wall disposed around an axis and extending between an open end of the housing and a floor of the housing with the floor extending toward the axis. A plurality of splines are spaced around the annular wall and extends between the open end and the floor. The splines define a work surface for engaging teeth of a clutch plate with the work surface being fractured from the annular wall providing a substantially normal relationship to the annular wall.

10 Claims, 2 Drawing Sheets

Fig-3

LANCE-AND-FORM SPLINES WITH FORMED HOUSING LIP SNAP RING RETENTION

PRIOR APPLICATIONS

This Application claims priority to U.S. Provisional Patent Application 61/522,797, filed on Aug. 12, 2011.

FIELD OF THE INVENTION

The present invention relates generally towards an improved clutch hub and clutch housing. More specifically, the present invention relates to an improved spline configuration for a clutch hub and clutch housing.

BACKGROUND OF THE INVENTION

Clutch assemblies are known to be integral parts of vehicle transmissions. Clutch housings and hubs define an annular wall circumscribing a housing axis. The annular wall defines a plurality of splines that extend from an open end to a floor of the housing, and are generally parallel to the axis. The splines engage clutch plates in a known manner to shift transmission gears in response to an accelerating or decelerating vehicle.

Presently, splines are formed in the annular wall of the housings by a series of die presses or in a progressive die. These dies are known to be exceedingly expensive, requiring a press having a high tonnage and associated transfer system for moving the pre-form to the sequentially arranged dies.

Additionally, soft or low strength sheet metal is required to allow the dies to form each of the splines. Still further, because the splines are formed in a die press, die relief is required of each spline to facilitate separating two halves of the die after formation. This requires each spline to have a trapezoidal configuration, where a work surface is substantially angled to the annular wall providing die relief. Due to the trapezoidal shape required of each spline for proper formation, a limited number of splines can be formed in the annular wall, reducing surface area of contact between the splines and the clutch plate.

Therefore, it would be desirable to provide a new form of spline to resolve the problems associated with the prior art spline configuration clutch housings and hubs.

SUMMARY

A housing for use with a clutch assembly includes an annular wall disposed around an axis and extending between an open end of the housing and the floor of the housing. The floor of the housing extends toward the axis. A plurality of splines are spaced around the annular wall and extend between the open end and the floor. The splines define a work surface for engaging teeth of a clutch plate with the work surface being fractured from the annular wall, providing a substantially normal relationship to the annular wall.

Fracturing the work surface from the annular wall, also known as lance and form, solves the mechanical deficiencies associated with the prior art clutch housings and hubs. For example, forming a spline through a lance and form process eliminates a substantial number of work stations required of a progressive die system. This significantly reduces the cost associated with forming the splines in the annular wall. Furthermore, the fracturing process used to form a work surface significantly reduces the width of each spline because die relief is not required. Therefore, an increase in the number of splines formed in the annual wall is now possible, which increases the surface area of contact between the splines and the clutch plates.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION

Figure 1:
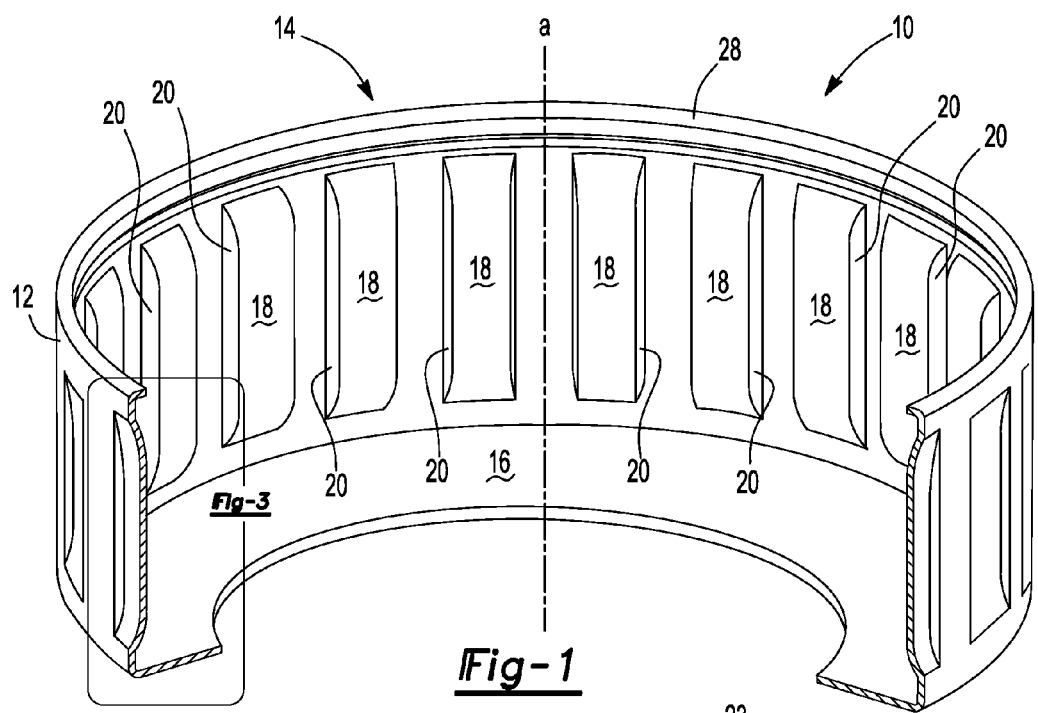
FIG. 1 shows a partial perspective view of the clutch housing of the present application.

Referring to FIG. 1, a clutch housing of the present invention is generally shown at 10. The housing 10 includes an annular wall 12 disposed around an axis a. The wall 12 extends between an open end 14 and a floor 16 of the housing 10. The floor 16 extends toward the axis a.

A plurality of splines 18 are spaced around the annular wall 12 and extend between the open end 14 and the floor 16 of the housing 10. Each of the splines 18 define a work surface 20 for engaging the teeth 21 of a clutch plate 23. The work surface 20 is fractured from the annular wall 12 providing a substantially normal relationship between the work surface 20 with the annular wall 12.

The fracturing of the work surface 20 from the annular wall 12 is contemplated to be performed by lancing and forming the splines 18 from the annular wall 12. Although the figures represent the splines 18 protruding from the annular wall inwardly toward the axis a, it should be understood by those of skill in the art that the splines 18 may also project radially outwardly of the annular wall 12 away from the axis a. It is further contemplated by the inventor that the steel used to form the housing is a high carbon steel ASTM 1030 to 1035 standard. This is contemplated to be cooperable to hardened clutch plates 23 also formed of ASTM 1030 steel.

Figure 2:
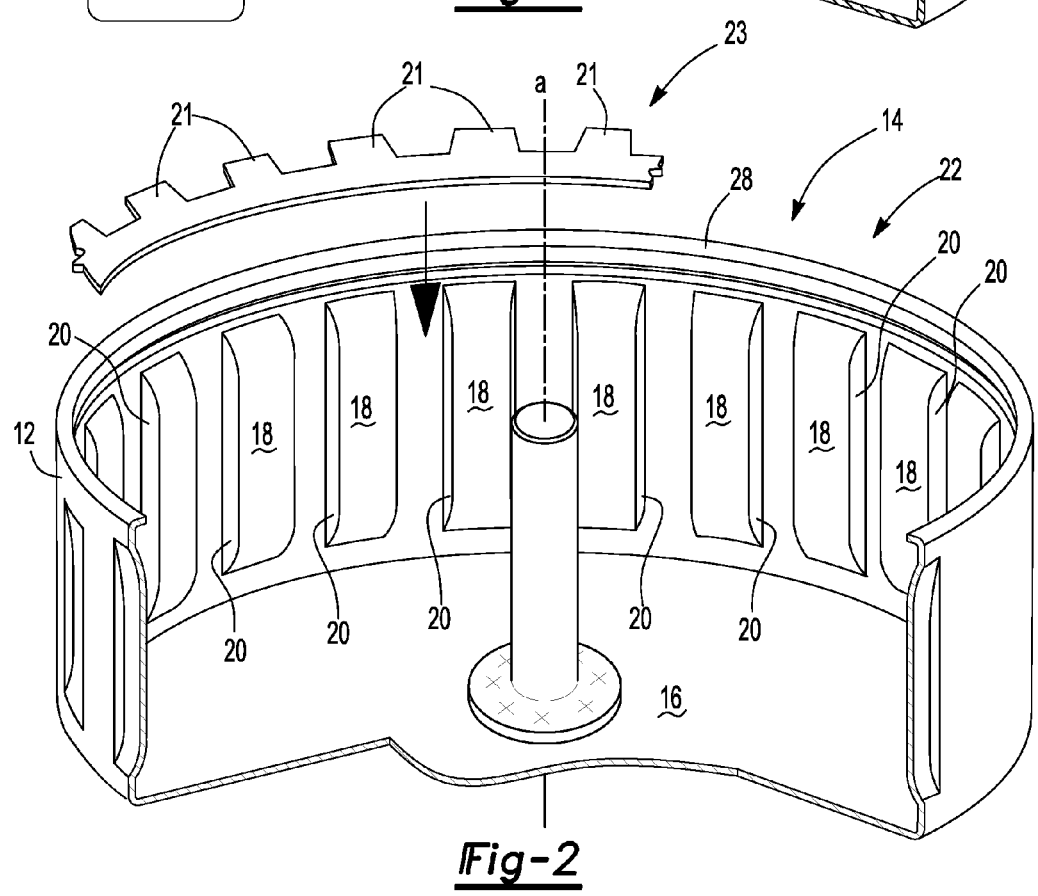
FIG. 2 shows a partial perspective view of the clutch hub of the present invention.

Because the work surfaces 20 of each of the plurality of splines 18 is substantially normal to the annular wall 12, adjacent work surfaces 20 of adjacent splines 18 are substantially parallel. FIG. 2 shows an alternate embodiment of the present invention at 22 where like numerals represent like elements to the first embodiment. In the alternative embodiment, the housing 22 takes the form of a clutch hub having a central shaft 24 aligning with the axis a of the original embodiment.

Figure 3:
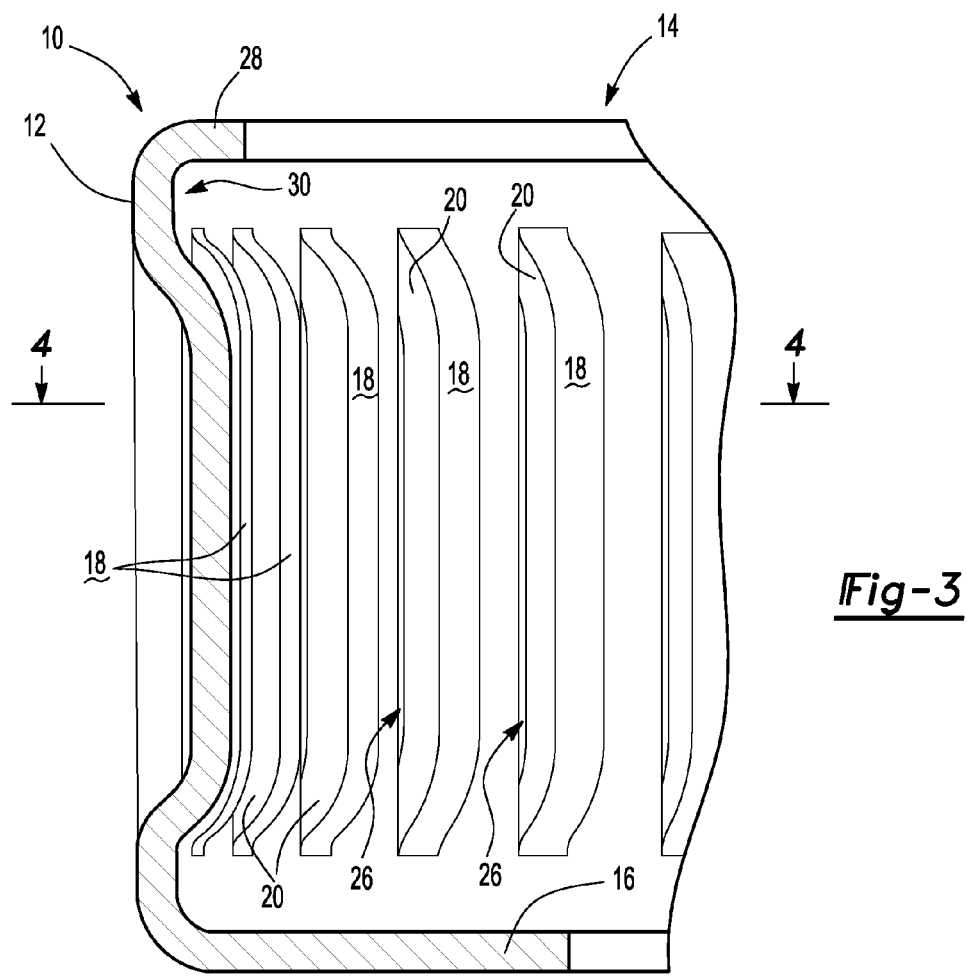
FIG. 3 shows an expanded view of section 3-3 of FIG. 2.

FIG. 3 shows an oil slot 26 defined between the splines 18 and the annular wall 12. The configuration of the oil slots 26 will be explained further herein below.

As best seen in FIGS. 1-3, the housing 10 defines a retainer 28 formed at the open end 14 of the annular wall 12. The retainer 28 is configured to retain a snap ring (not shown) in a groove 30. Therefore, it is represented that the plurality of splines 18 are spaced from the open end of the annular wall 12.

Figure 4:
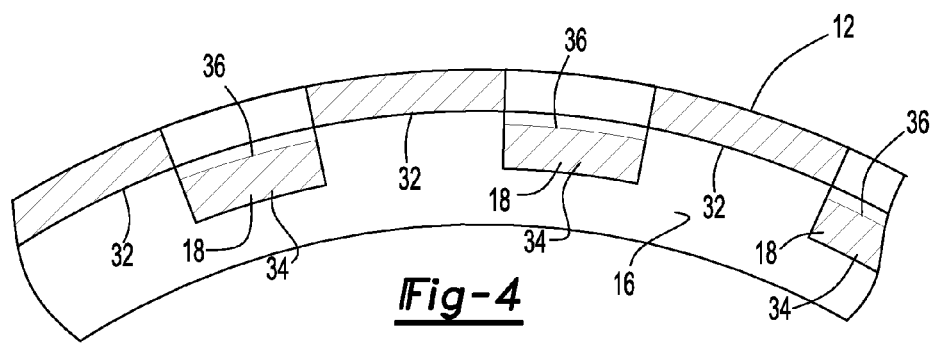
FIG. 4 shows a sectional view of the inventive splines of the present application through line 4-4 of FIG. 3.
Figure 5:
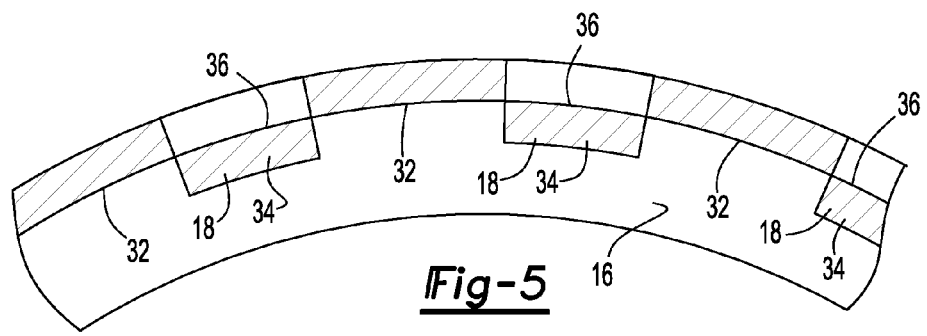
FIG. 5 shows a sectional view of an alternative embodiment of the inventive splines of the present Application.

Referring now to FIG. 4, a sectional view of the annular wall 12 taken through line 4-4 of FIG. 3 is shown. The annular wall 12 defines a base surface 32. Each spline 18 defines a distal surface 34 that is spaced radially inwardly from the base surface 32, and also defines a proximal surface 36 that is proximate to the base surface 32 of the annular wall 12. In this embodiment, the proximal surface 36 is spaced from the base surface 32 of the annular wall 12, providing the oil slot 26 also represented in FIG. 2. FIG. 5 shows an alternate embodiment where the proximal surface 36 of the spline 18 is located below the base surface 32 of the annular wall 12. Therefore, the oil slots are closed by virtue of the overlap between the splines 18 and the annular wall 12.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation while material to the teachings of the invention without departing from the essential scope thereof. Therefore, it is intended that the invention not be limited to the particular embodiment disclosed as the best mode contemplated for carrying out this invention but that the invention will include all embodiments falling within the scope of the appended claims.

What is claimed is:

1. A housing for use with a clutch assembly, comprising:
    an annular wall disposed around an axis and extending between an open end of said housing and a floor of said housing with said floor extending toward said axis;
    a plurality of splines spaced around said annular wall and extending between said open end and said floor, said splines defining a work surface for engaging teeth of a clutch plate with said work surface being an edge fractured from said annular wall providing a substantially normal relationship between said work surface and said annular wall; and
    said annular wall defines a base surface and each of said splines define a distal surface being spaced from said base surface and a proximal surface being proximate to said base surface.

2. The housing set forth in claim 1, wherein said annular wall is disposed on a clutch hub.

3. The housing set forth in claim 1, wherein said proximal surface is disposed radially inwardly from said base surface of said annular wall providing a space between said proximal surface and said base surface.

4. The housing set forth in claim 1, wherein said proximal surface is disposed radially outwardly from said base surface of said annular wall.

5. The housing set forth in claim 1, wherein each of said plurality of splines is spaced from said open end of said housing.

6. The housing set forth in claim 1, wherein said floor of said housing defines an annular opening.

7. The housing set forth in claim 1, wherein said floor extends to a shaft disposed at said axis defined by said annular wall.

8. The housing set forth in claim 1, wherein said work surfaces of adjacent said splines are substantially parallel.

9. The housing set forth in claim 1, wherein said work surface of each of said splines are oriented in a substantially parallel relationship.

10. The housing set forth in claim 1, wherein the plurality of splines extends toward said axis defined by said annular wall.

* * * * *